United States Patent
Okanoue

Patent Number: 5,127,025
Date of Patent: Jun. 30, 1992

[54] SPACE DIVERSITY TDMA RECEIVER

[75] Inventor: Kazuhiro Okanoue, Tokyo, Japan

[73] Assignee: NEC Corporation, Tokyo, Japan

[21] Appl. No.: 517,883

[22] Filed: May 2, 1990

[30] Foreign Application Priority Data

May 2, 1989 [JP] Japan .................... 1-113202

[51] Int. Cl.[5] ............................................. H04B 7/08
[52] U.S. Cl. ................................. 375/100; 455/135
[58] Field of Search .................. 375/100, 102, 40; 455/133, 134, 272, 135, 136; 371/68.1, 68.2

[56] References Cited

U.S. PATENT DOCUMENTS

| | | | |
|---|---|---|---|
| 4,513,412 | 4/1985 | Cox | 455/134 |
| 4,733,402 | 3/1988 | Monsen | 375/100 |
| 4,884,272 | 11/1989 | McConnell | 375/100 X |

OTHER PUBLICATIONS

Peter Monsen, "Adaptive Equalization of Slow Fading Channel", IEEE Transactions on Communications, vol. COM-22, No. 8, Aug. 1974.

Primary Examiner—Benedict V. Safourek
Attorney, Agent, or Firm—Sughrue, Mion, Zinn Macpeak & Seas

[57] ABSTRACT

In a space diversity receiver, multiple signal paths are connected respectively to antennas for multipath reception. Each signal path includes a digital demodulator coupled to the antenna and an impulse response detector, or autocorrelator connected to the demodulator for deriving a channel impulse response of each one of the multiple paths. A maximum response detector is connected to each impulse response detector for detecting equalizable delay components which give a maximum response value and a unequalizable delay components. A power ratio of the unequalizable delay components to the equalizable delay components is derived for each signal path and a minimum value of the power ratios is determined and one of the signal paths in which the mininmum value is detected is selected. The output signal of the demodulator of the selected signal path is applied to one input of an equalizer, or a maximum likelihood sequence estimator, and the equalizable delay components of the selected signal path are applied to the other input of the equalizer.

7 Claims, 6 Drawing Sheets

TIME = k

| $S_0$ | $S_1$ | $S_2$ | $S_3$ |
|---|---|---|---|
| -1 | -1 | -1 | -1 |
| -1 | -1 | -1 | +1 |
| -1 | -1 | +1 | -1 |
| -1 | -1 | +1 | +1 |
| -1 | +1 | -1 | -1 |
| -1 | +1 | -1 | +1 |
| -1 | +1 | +1 | -1 |
| -1 | +1 | +1 | +1 |
| +1 | -1 | -1 | -1 |
| +1 | -1 | -1 | +1 |
| +1 | -1 | +1 | -1 |
| +1 | -1 | +1 | +1 |
| +1 | +1 | -1 | -1 |
| +1 | +1 | -1 | +1 |
| +1 | +1 | +1 | -1 |
| +1 | +1 | +1 | +1 |

TIME = k+1

| $S_0$ | $S_1$ | $S_2$ | $S_3$ |
|---|---|---|---|
| -1 | -1 | -1 | -1 |
| -1 | -1 | -1 | +1 |
| -1 | -1 | +1 | -1 |
| -1 | -1 | +1 | +1 |
| -1 | +1 | -1 | -1 |
| -1 | +1 | -1 | +1 |
| -1 | +1 | +1 | -1 |
| -1 | +1 | +1 | +1 |
| +1 | -1 | -1 | -1 |
| +1 | -1 | -1 | +1 |
| +1 | -1 | +1 | -1 |
| +1 | -1 | +1 | +1 |
| +1 | +1 | -1 | -1 |
| +1 | +1 | -1 | +1 |
| +1 | +1 | +1 | -1 |
| +1 | +1 | +1 | +1 |

SPACE DIVERSITY TDMA RECEIVER

BACKGROUND OF THE INVENTION

The present invention relates generally to communications systems, and more specifically to a space diversity receiver for TDMA (time division multiple access) burst signals which are likely to be affected by intersymbol interference due to multipath reception.

Multipath distortion is the result of simultaneous reception of a signal direct from the point of transmission and delayed signals reflected off buildings and the like. Decision-feedback equalization and most likelihood sequence estimation techniques are currently receiving attention for correcting errors in high-speed burst signals on multipath reception as discussed in Proakis, "Digital Communications", McGraw-Hill, 1983. Space diversity reception for burst signals is also discussed in William C. Y. Lee, "Mobile Communication Engineering", McGraw-Hill, 1982. These techniques are not successful for applications in which a substantial amount of delay is involved in multipath reception. Space diversity reception for burst signals using decision-feedback equalization is described in "Adaptive Equalization of the Slow Fading Channel", IEEE Transactions on Communications, Peter Monsen, Vol. COM-22, No. 8, August 1974. However, the shortcoming of this approach is that practical realizations would result in circuitry which is too complex to implement receivers at a moderate cost.

SUMMARY OF THE INVENTION

It is therefore an object of the present invention to provide a space diversity receiver capable of selecting a high-speed digitally modulated burst signal received over multipaths.

According to the present invention, a plurality of signal paths are provided respectively for a plurality of antennas. Each signal path comprises a demodulator circuit coupled to the associated antenna, and an impulse response detector connected to the demodulator circuit for deriving from the output signal of the demodulator circuit an impulse response of a transmission channel from a transmitter to the antenna. A maximum response detector is coupled to each impulse response detector for detecting equalizable delay components and unequalizable delay components wherein the equalizable delay components represent one of a plurality of sets of impulse response values having a maximum power and the unequalizable represent the remainder impulse response values. A plurality of power ratio deriving circuits are provided respectively for the signal paths to derive a power ratio of the nonequalizable delay components to the equalizable components for each signal path. A minimum value of the power ratios is detected by a minimum detector and one of the signal paths from which the minimum value is detected is selected.

In a preferred embodiment, the burst signal contains a preamble of a predetermined bit pattern, and the impulse response detector comprises a correlator for detecting bit-by-bit correlation between the preamble and an intermediate portion of the preamble stored in memory to produce a sequence of response values respectively for different delay times. The maximum response detector squares each of the response values of the sequence, divides the squared response values into a plurality of successive groups such that each group is spaced by one delay time with respect to adjacent groups, sums the squared response values of each of the groups to produce a plurality of summed response values, detects a maximum value of the summed response values, and selects a group of response values from the sequence supplied from the impulse response detector which corresponds to a group from which the maximum value is derived and supplies the selected group of response values as the equalizable components to the power ratio deriving circuit as well as to the equalizer, and supplies the rest of the response values of the sequence as the unequalizable delay components to the power ratio deriving circuit. The maximum likelihood sequence estimator comprises a matched filter to which the output signal of the RF section of the selected signal path and the selected group of response values are applied and a branch metric coefficients calculator for deriving branch metric coefficients from the selected group of response values. The output of the matched filter and the branch metric coefficients are combined and applied to a Viterbi decoder. The output signal of the demodulator circuit of the selected signal path is applied to one input of an equalizer, or a maximum likelihood sequence estimator, and the equalizable components of the selected signal path is applied to a second input of the equalizer.

BRIEF DESCRIPTION OF THE DRAWINGS

The present invention will be described in further detail with reference to the accompanying drawings, in which.

DETAILED DESCRIPTION

Figure 1:
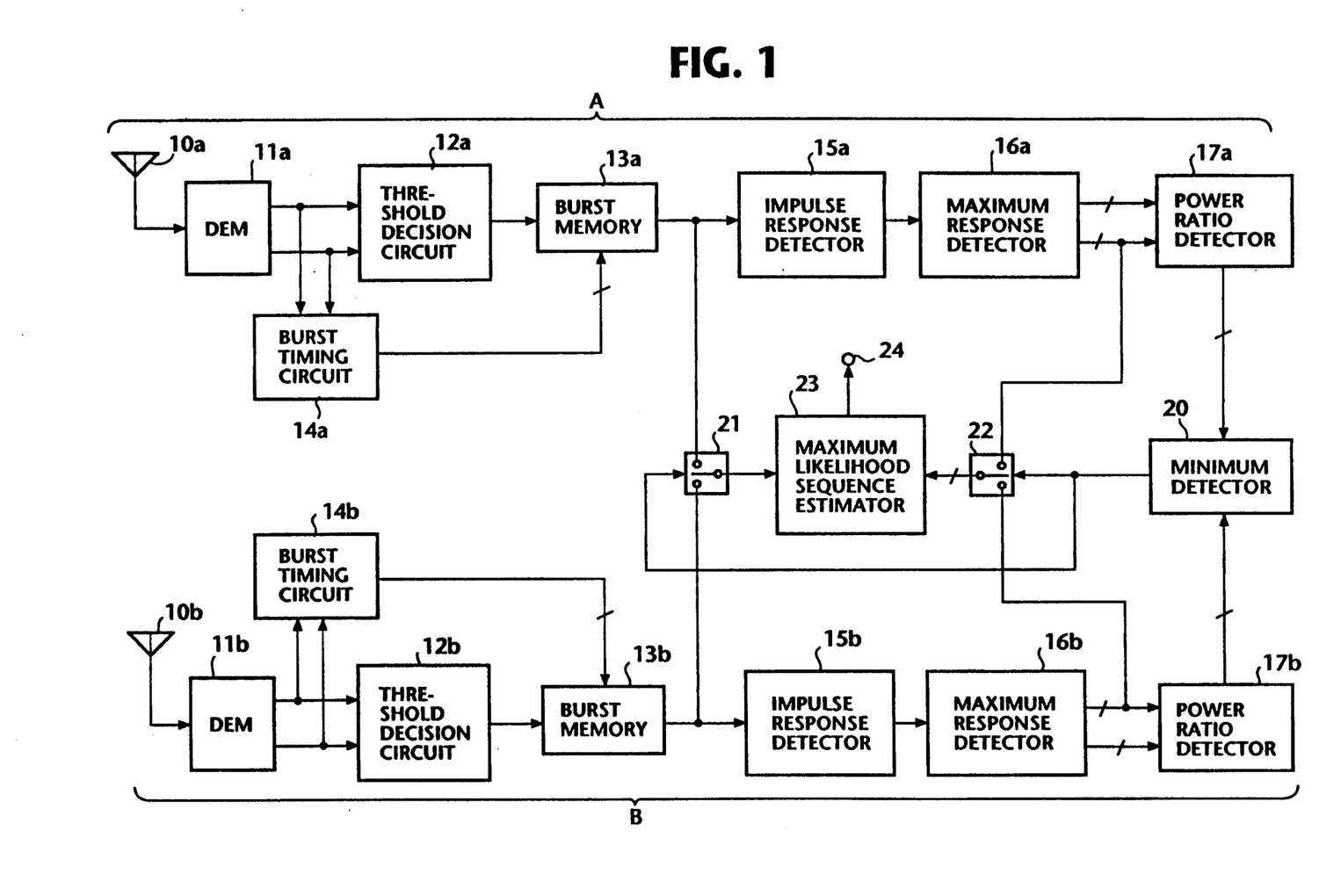
FIG. 1 is a block diagram of a space diversity receiver according to an embodiment of the present invention using two antennas.

In FIG. 1, a space diversity receiver of this invention generally comprises a plurality of identical signal paths. For purposes of illustration, two identical signal paths A and B are shown. On each signal path, BPSK (binary phase shift keyed) bursts transmitted on an RF carrier are received by antenna 10 and fed to a quadrature demodulator 11 which converts the received signal into in-phase and quadrature signals of baseband frequency. The baseband signals of channel A are fed to a threshold decision circuit 12 formed by a pair of analog-to-digital converters whose outputs are combined to form a single stream of complex-valued digital signals. The output of threshold decision circuit 12 is fed to a burst memory 13. A burst timing circuit 14 is coupled to the outputs of quadrature demodulator 11 to generate a write signal at the beginning of a time slot uniquely assigned to the receiver and subsequently generate a read signal, the write and read signals being fed to burst memory 13 to store the burst signal on the assigned time slot and read it out of the memory 13 into a channel impulse response detector 15.

As will be described, detector 15 detects the impulse response of the transmission channel from the transmitter to antenna 10 by autocorrelation between the symbols contained in a preamble of the received burst and a maximum length sequence with period 15. The output of impulse response detector 15 is a sequence of response values which are fed to a maximum response detector 16 which divides the sequence into a plurality of successive sets of response values and determines one of the sets having a maximum power and classifies the components of the determined set as equalizable delay components for maximum likelihood sequence estimation and classifies the remainder components of the sequence as unequalizable delay components.

The equalizable delay components and unequalizable delay components of channel A are supplied to a power ratio detector 17a which derives a power ratio of the unequalizable to equalizable delay components of channel A and supplies it to the first input of a comparator, or minimum detector 20. The ratio of the unequalizable to equalizable components of channel B is also derived by a power ratio detector 17b and fed to the second input of the minimum detector 20. Minimum detector 20 determines which one of the ratios is smaller and generates a switching control signal to select one of the signal paths associated with the detected smaller ratio.

Switches 21 and 22 are controlled by the output of minimum detector 20 to selectively couple the output of burst memory 13a or 13b to a first input of a maximum likelihood sequence estimator 23, or equalizer and selectively couple the equalizable components output of maximum response detector 16a or 16b to a second input of the equalizer.

If the total power of the equalizable delay components derived from channel A is greater than that of channel B, the ratio provided by power ratio detector 17a is smaller than that provided by power ratio detector 17b and minimum detector 20 supplies a logic-0 output to switches 21 and 22 to couple the output of burst memory 13a to equalizer 23 and the equalizable delay components of channel A to equalizer 23. Conversely, if the total power of the equalizable delay components of channel B is a greater than that of channel A, the ratio provided by power ratio detector 17b is smaller than that of detector 17a and minimum detector 20 supplies a logic-1 output to switches 21 and 22 to couple the output of burst memory 13b and the equalizable delay components of channel B to equalizer 23.

Detailed structures and functions of the present invention will now be given below with reference to FIGS. 2 to 8.

Figure 2:
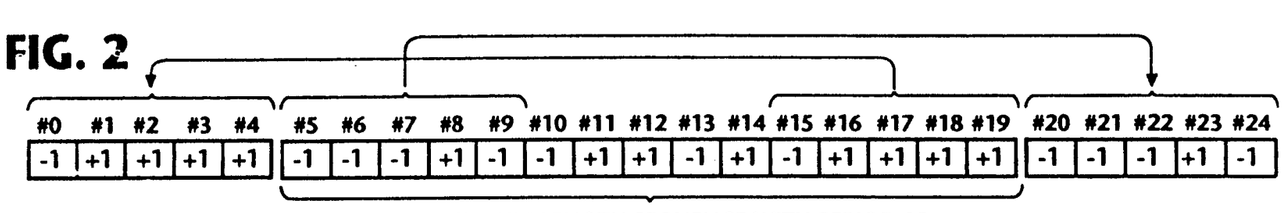
FIG. 2 is an illustration of the bit pattern of a preamble employed in the present invention.

Each transmitted burst comprises a preamble followed by a data field. The preamble is of a 25-bit sequence which, as shown in FIG. 2, consists of a 5-bit header sequence representing #0 to #4 bits of the preamble, a 15-bit intermediate sequence representing #5 to #19 bits, and a 5-bit trailer sequence representing #20 to #24 bits. The intermediate sequence is a maximum length sequence with period 15 consisting of (−1, −1, −1, +1, −1, −1, +1, +1, −1, +1, −1, +1, +1, +1, +1). The 5-bit header sequence is a replica of the last five bits of the maximum length sequence and the 5-bit trailer sequence is a replica of the first five bits of the maximum length sequence.

Figure 3:
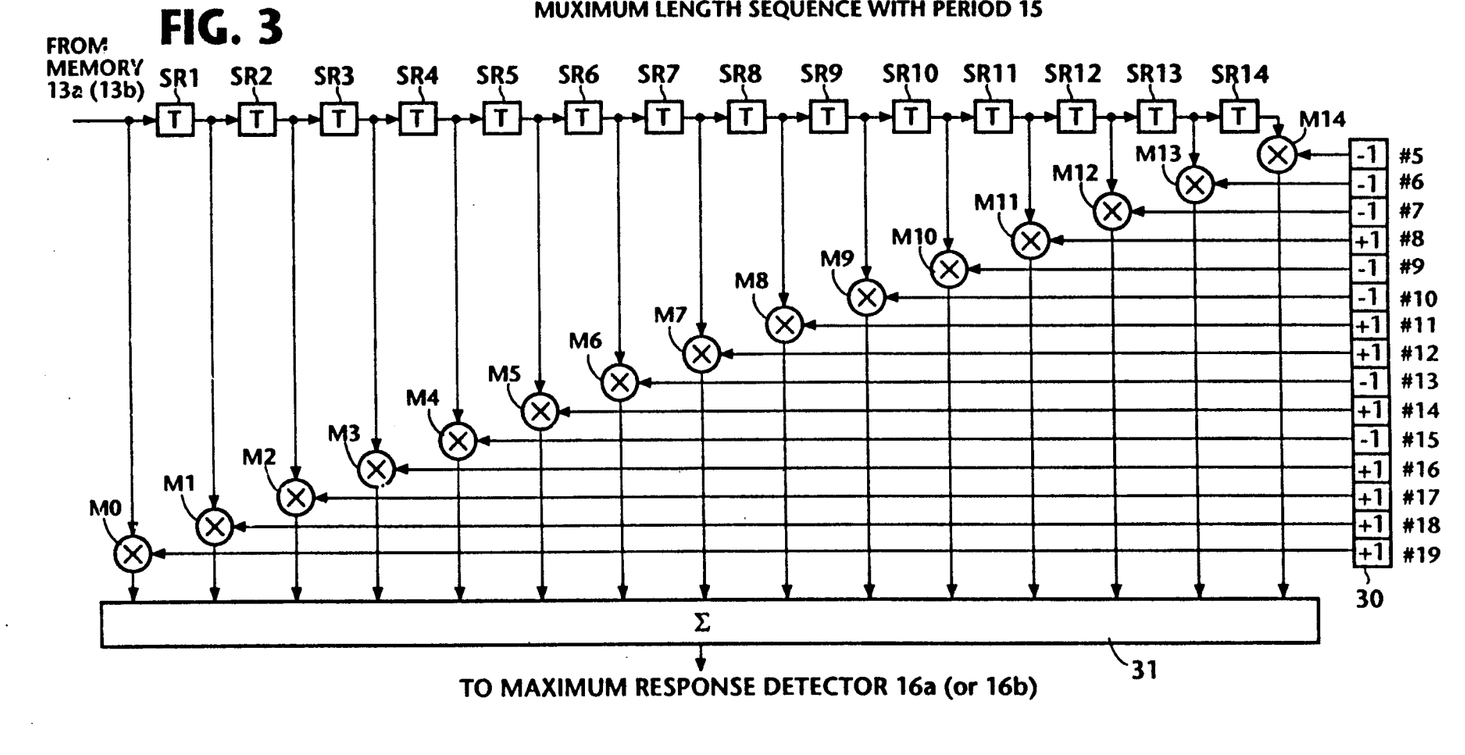
FIG. 3 is a block diagram of each of the channel impulse response detectors of FIG. 1.
Figure 4A:
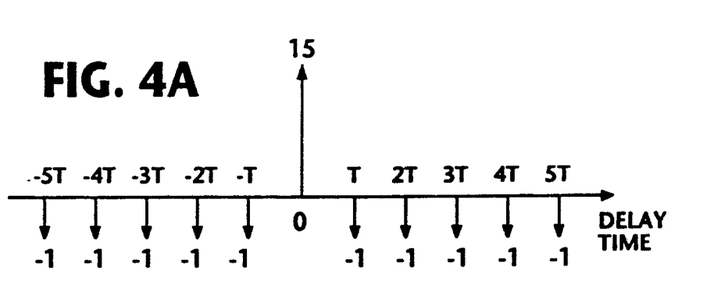
FIG. 4A shows an impulse response of a transmission channel with not intersymbol interference.
Figure 4B:
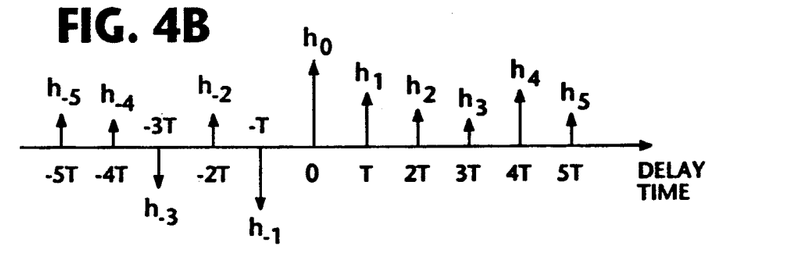
FIG. 4B shows an impulse response of a transmission line affected by intersymbol interference.

The preamble of a burst signal demodulated on each signal path is stored into burst memories 13a and 13b during the period of the assigned time slot and subsequently read out of the memories to channel impulse response detectors 15a and 15b, respectively, at such a rate commensurate with the processing speed of the subsequent circuitry. Details of each impulse response detector are shown in FIG. 3. The impulse response detector is essentially an autocorrelation detector and comprises a tapped delay line formed by a series of shift registers SR1 through SR14 each with a unit delay time T, or symbol interval. A series of bits comprising a preamble are fed to the first shift register SR1 and successively stepped along the delay line at symbol intervals to the last shift register SR14. Taps of the delay line are coupled respectively to multipliers M0 through M14 where the successively delayed bits are multiplied with the contents of a register 30 which correspond to the bit pattern of the maximum length sequence of the preamble. Detection of correlation begins at the instant #0 bit of a preamble is entered into multiplier M14 and multiplied with the value −1 of #5 bit of the stored preamble and ends at the instant #24 bit of the preamble is entered into multiplier M0 and multiplied with the value +1 of #19 bit of the stored preamble. The outputs of multipliers M0~M14 are summed by an adder 31 to produce a series of output values representing an impulse response of the transmission channel. If there is no intersymbol interference and the sample timing of each signal path is synchronized with each received sequence, each of multipliers M0 to M14 simultaneously produces a +1 output at the instant the #5 to #19 bits of the incoming preamble are simultaneously entered into multipliers M0 to M14 respectively and adder 31 produces an output value 15 as shown in FIG. 4A. The instant at which the peak output value is generated is the reference timing, or OT, and the delay times with respect thereto are indicated by a step of intervals T. Under such ideal conditions, the adder 31 will produce an output value −1 at each of ten delayed instants −T to −5T and T to 5T. If the received sequence is delayed by 3T, for example, with respect to the sample timing, a peak value will be generated by adder 31 at the instant corresponding to −3T, and this peak value is used as a reference timing to effect the autocorrelation. Since the received sequence has been affected by intersymbol interference, the channel impulse response will usually contain impulses $h_{-5}$ to $h_5$ of complex values as shown in FIG. 4B.

Figure 5:
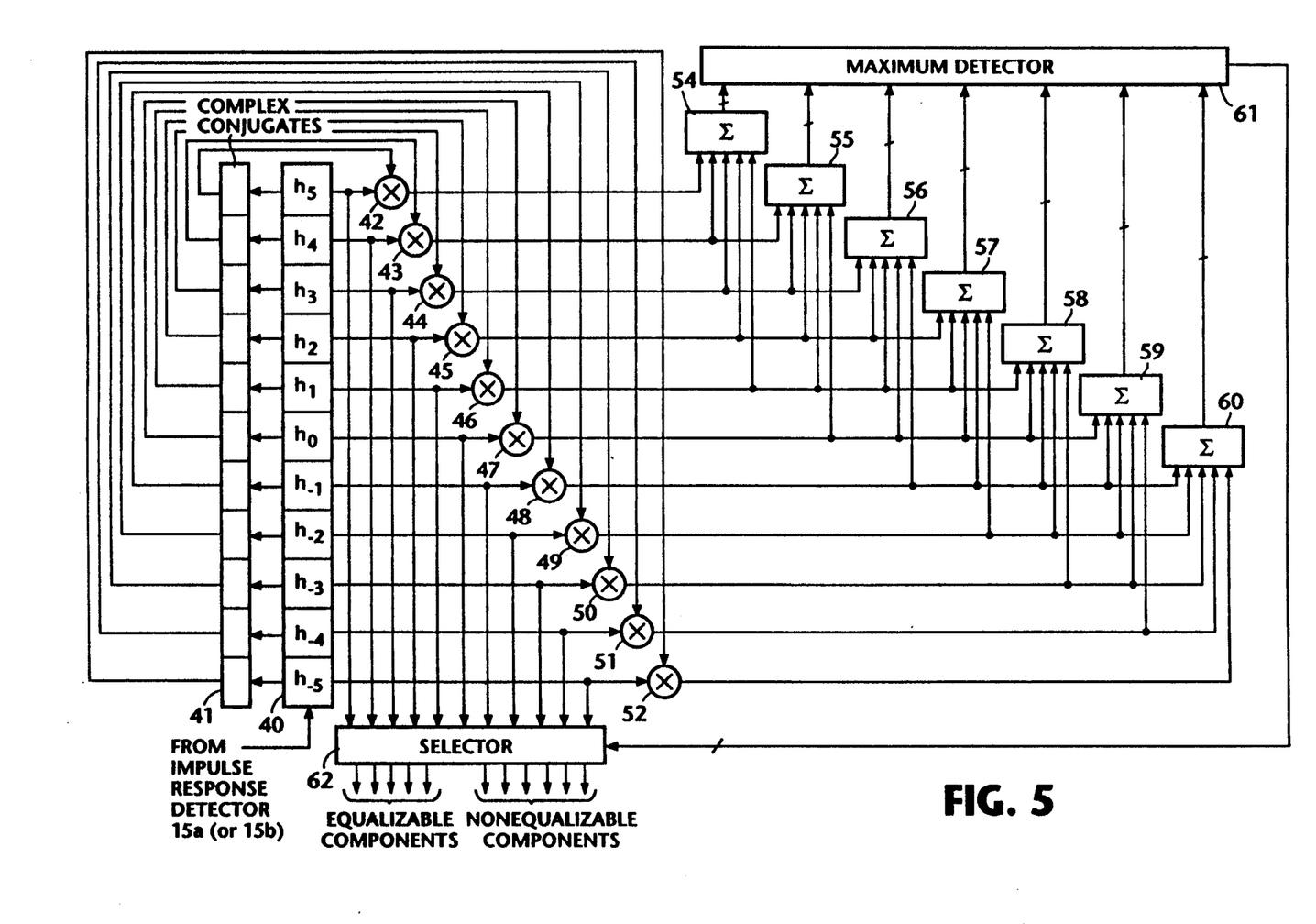
FIG. 5 is a block diagram of each of the maximum response detectors of FIG. 1.

Details of each maximum response detector 16 are shown in FIG. 5. It is assumed that each maximum response detector 16 has a length 5, i.e., the detector 16 is capable of detecting a channel impulse response of length 5T. Essentially, the function of maximum response detector is to determine a consecutive series of five impulses $h_i$, $h_{i+1}$, $h_{i+2}$, $h_{i+3}$, and $h_{i+4}$ which maximize the following:

$$\sum_{k=0}^{4} |h_{i+k}|^2 \quad (\text{where}, i = -5, -4, \ldots, 0, 1)$$

and supply these five impulses as equalizable delay components to power ratio detector 17 as well as to switch 22 and the remainder six impulses as unequalizable delay components to power ratio detector 17.

As shown in FIG. 5, each maximum response detector 16 comprises a 11-stage shift register 40 to store a series of 11 response impulse values $h_0$, $h_{\pm 1}$, $h_{\pm 2}$, $h_{\pm 3}$, $h_{\pm 4}$, $h_{\pm 5}$ from the output of impulse response detector 15. A complex conjugate generator 41 has conjugate conversion stages coupled respectively to the corresponding stages of shift register 40 to generate a set of 11 complex conjugate values of the response impulse values. The conjugate values are respectively multiplied with the contents of the corresponding impulse values by multipliers 42 through 52 to produce signals $|h_5|^2$, $|h_4|^2$, $|h_3|^2$, $|h_2|^2$, $|h_1|^2$, $|h_0|^2$, $|h_{-1}|^2$, $|h_{-2}|^2$, $|h_{-3}|^2$, $|h_{-4}|^2$ and $|h_{-5}|^2$, respectively, at the outputs of multipliers 42 through 52. A plurality of adders 54 to 60 are provided. Each of the adders 54~60 has five input terminals and the outputs of multipliers 42 to 52 are divided into seven successive groups of five consecutive outputs each. Specifically, the outputs of multipliers 42 to 46 are fed to adder 54 to produce a sum $|h_5|^2$ to $|h_1|^2$, the outputs of multipliers 43 to 47 are fed to adder 55 to produce a sum $|h_4|^2$ to $|h_0|^2$, the outputs of multipliers 44 to 48 are fed to adder 56 to produce a sum $|h_3|^2$ to $|h_{-1}|^2$, the outputs of multipliers 45 to 49 are fed to adder 57 to produce a sum $|h_2|^2$ to $|h_{-2}|^2$, the outputs of multipliers 46 to 50 are fed to adder 58 to produce a sum $|h_1|^2$ to $|h_{-3}|^2$, the outputs of multipliers 47 to 51 are fed to adder 59 to produce a sum $|h_0|^2$ to $|h_{-4}|^2$, and finally the outputs of multipliers 48 to 52 are fed to adder 60 to produce a sum $|h_{-1}|^2$ to $|h_{-5}|^2$.

A maximum value of the outputs of adders 54 to 60 is detected by a maximum detector 61. On detecting the maximum value, detector 61 supplies a switching control signal to a selector 62 to permit it to select the five consecutive stages of shift register 40 which correspond to the adder which has produced the maximum value and feed their outputs to the associated power ratio detector 17 as well as switch 22 as equalizable delay components $\hat{h}_i$, $\hat{h}_{i+1}$, $\hat{h}_{i+2}$, $\hat{h}_{i+3}$, and $\hat{h}_{i+4}$. Selector 62 further selects the remainder stages of shift register 40 and applies their outputs as unequalizable delay components to the power ratio detector 17.

Figure 6:
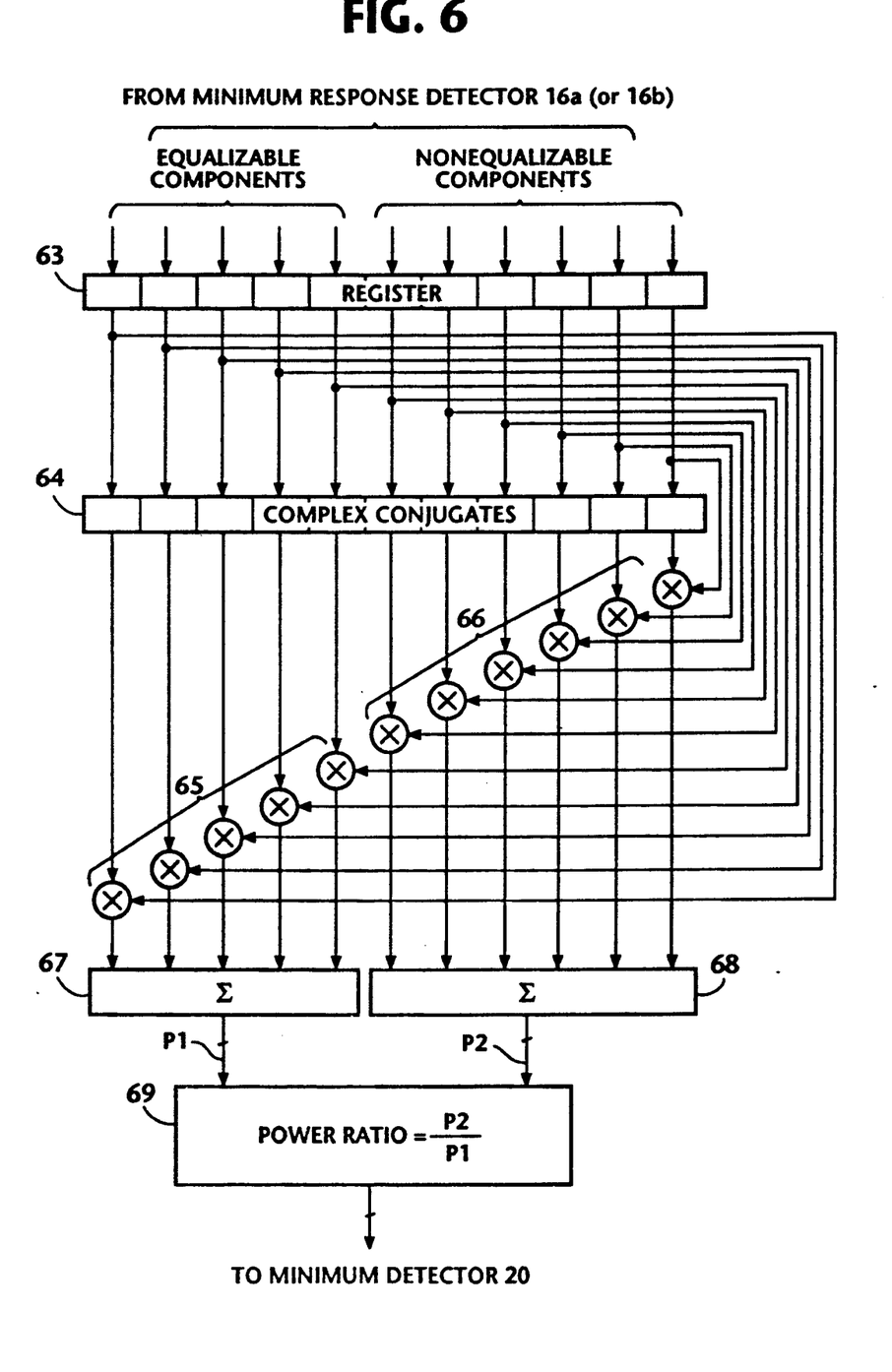
FIG. 6 is a block diagram of each power ratio detector of FIG. 1.

As shown in detail in FIG. 6, each power radio detector 17 comprises a register 63 to which the equalizable and unequalizable outputs of the associated maximum response detector 16 are supplied. A conjugate converter 64 is connected to the register to provide a set of complex conjugates of the equalizable components to multipliers 65 to which the equalizable components are also applied from register 63 to generate a set of squared values of equalizable components. Converter 64 further provides a set of complex conjugates of the unequalizable components to multipliers 66 to which the unequalizable components are also applied from register 63 to generate a set of squared values of unequalizable components. The outputs of multipliers 65 are summed by an adder 67 to produce an output signal P1 and the outputs of multipliers 66 are summed by an adder 68 to produce an output signal P2. A power ratio P2/P1 is derived by a divider 69 for application to minimum detector 20.

One of the signals received by channels A and B having a minimum value of the power ratios is selected by minimum detector 20 and maximum likelihood sequence estimator 23 receives signals from the selected channel path through switches 21 and 22.

Figure 7:
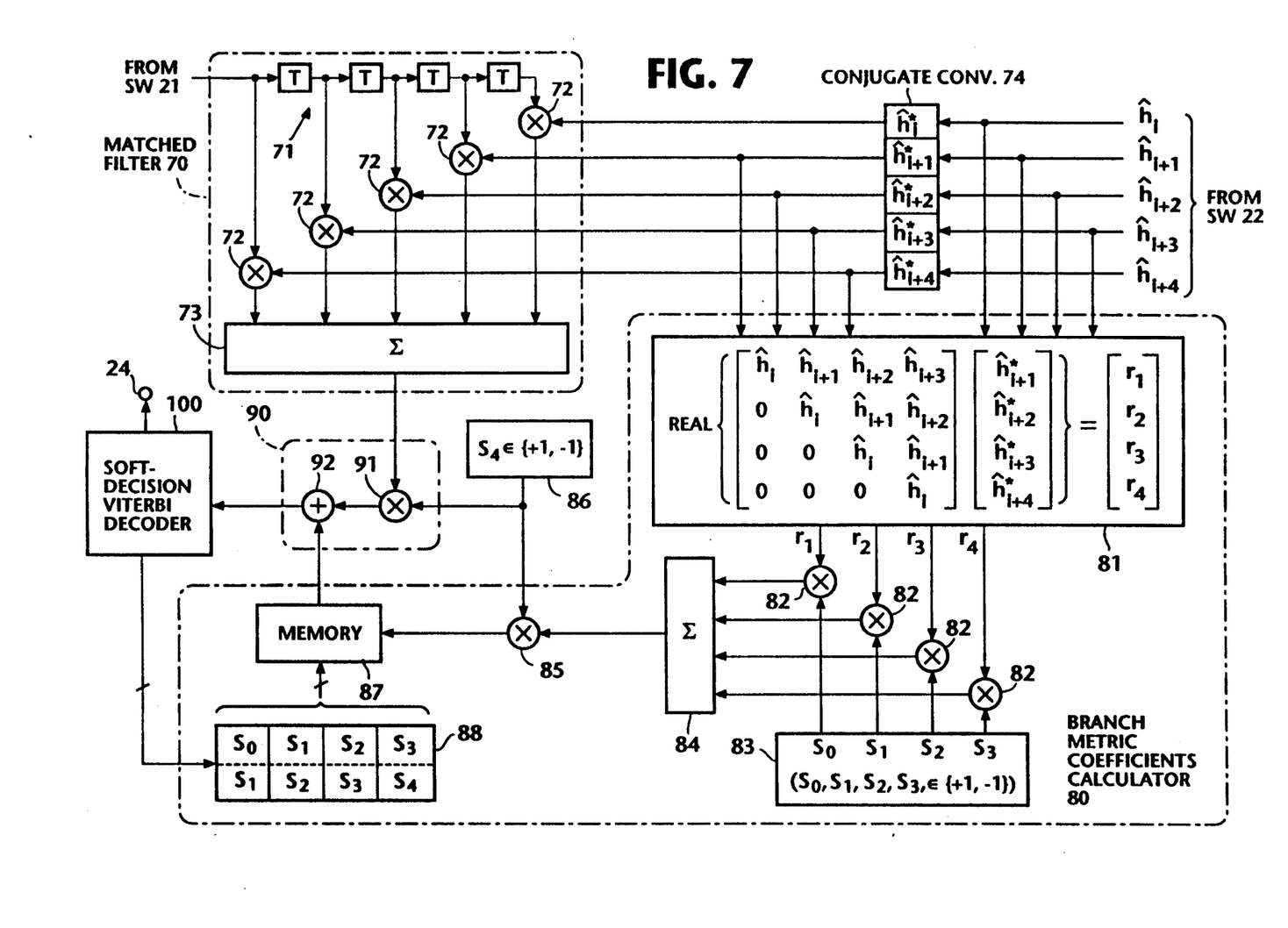
FIG. 7 is a block diagram of the maximum likelihood sequence estimator of FIG. 1.
Figure 8:
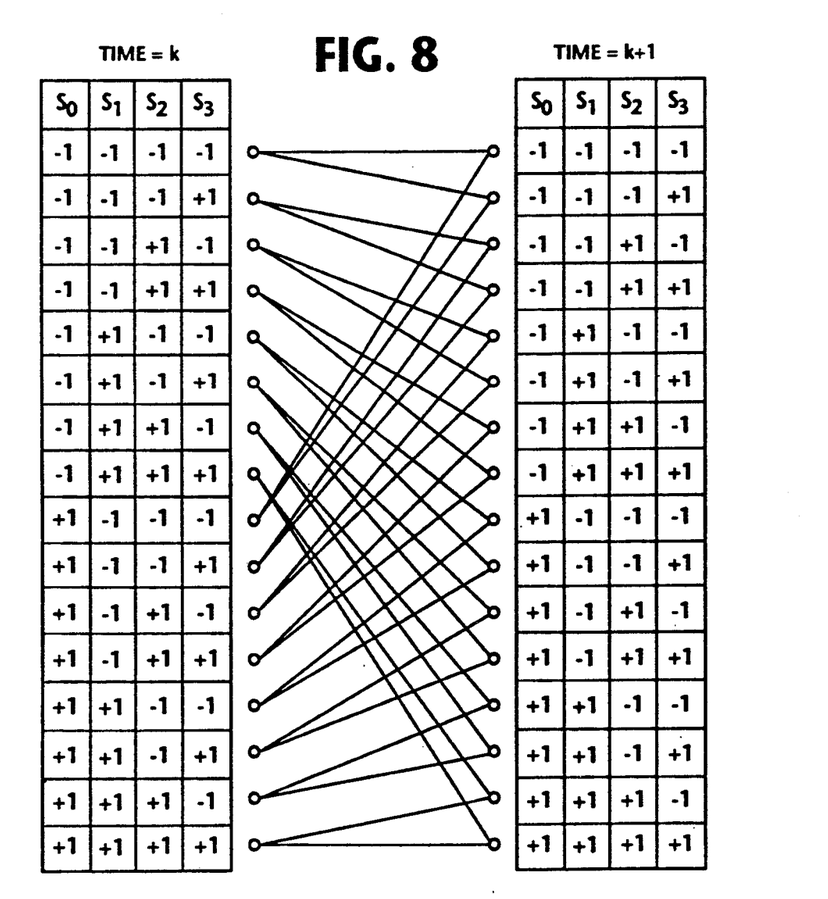
FIG. 8 is a trellis diagram of the Viterbi decoder of FIG. 7.

In FIG. 7, maximum likelihood sequence estimator 23 generally comprises a matched filter 70, a branch metric coefficient calculator 80, a combining circuit 90, and a 16-state soft-decision Viterbi decoder 100 whose trellis diagram is shown in FIG. 8. Matched filter 70 includes a tapped delay line 71 having five taps equal in number to the equalizable length 5. The output of switch 21 is fed to this tapped delay line. Five multipliers 72 are respectively coupled to the taps of the delay line 71. A conjugate converter 74 is connected to the outputs of switch 22 to produce complex conjugates of equalizable delay components $\hat{h}_i$, $\hat{h}_{i+1}$, $\hat{h}_{i+2}$, $\hat{h}_{i+3}$, and $\hat{h}_{i+4}$, which are supplied to multipliers 72 of matched filter 70. A series of five incoming bits from the memory 13 of the selected signal path are respectively multiplied with the conjugates of $\hat{h}_i$, $\hat{h}_{i+1}$, $\hat{h}_{i+2}$, $\hat{h}_{i+3}$, and $\hat{h}_{i+4}$ by multipliers 72 and summed by an adder 73 and fed to combining circuit 90.

Branch metric coefficient calculator 80 consists of a matrix calculator 81 which performs the following calculations on the inputs and outputs of conjugate converter 74:

$$\mathrm{Real}\left\{\begin{bmatrix} \hat{h}_i & \hat{h}_{i+1} & \hat{h}_{i+2} & \hat{h}_{i+3} \\ 0 & \hat{h}_i & \hat{h}_{i+1} & \hat{h}_{i+2} \\ 0 & 0 & \hat{h}_i & \hat{h}_{i+1} \\ 0 & 0 & 0 & \hat{h}_i \end{bmatrix}\begin{bmatrix} \hat{h}_{i+1} \\ \hat{h}_{i+2} \\ \hat{h}_{i+3} \\ \hat{h}_{i+4} \end{bmatrix}\right\} = \begin{bmatrix} r_1 \\ r_2 \\ r_3 \\ r_4 \end{bmatrix}$$

where $\hat{h}^*_{i+1}$, $\hat{h}^*_{i+2}$, $\hat{h}^*_{i+3}$, and $\hat{h}^*_{i+4}$ are the conjugates of $\hat{h}_{i+1}$, $\hat{h}_{i+2}$, $\hat{h}_{i+3}$, and $\hat{h}_{i+4}$, respectively.

Outputs $r_1$, $r_2$, $r_3$ and $r_4$ of calculator 81 are supplied respectively to multipliers 82. Sixteen combinations or sets of binary values of interfering symbols $S_0$, $S_1$, $S_2$ and $S_3$ are generated by a symbol generator 83, and $S_0$ to $S_3$ of each successive set are supplied to multipliers 82 during a symbol interval k to be multiplied with outputs $r_1$, $r_2$, $r_3$ and $r_4$, respectively. The outputs of multipliers 82 are summed by an adder 84 and fed to a multiplier 85 to which an interfering symbol $S_4$, which represents the state of the trellis at time $k+1$, is supplied from a symbol generator 86. The output of multiplier 86 is coupled to a branch coefficient memory 87 and stored in locations which are accessed by address codes $S_0$ to $S_3$ during interval k and address codes $S_1$ to $S_4$ during subsequent interval $k+1$. These address codes are supplied from an address generator 88. In this way, all branch metric coefficients needed for all possible state transitions on the trellis diagram are stored in memory 87. Therefore, the channel impulse response is reflected in the branch metric coefficients stored in memory 87.

Combining circuit 90 includes a multiplier 91 and an adder 92. Multiplier 91 multiplies the output of matched filter 70 with symbol $S_4$ and adder 92 combines the output of multiplier 91 with the output of memory 87 to produce a branch metric which is fed to Viterbi decoder 100. Viterbi decoder 100 subsequently reads branch metric coefficients out of memory 87 by driving the address generator 88.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A space diversity receiver comprising:

a plurality of antennas for receiving a digitally modulated burst signal from a transmitter;

a plurality of signal paths associated respectively with said antennas, each of said signal paths comprising demodulator means coupled to the associated antenna, impulse response detector means connected to said demodulator means for deriving from an output signal of the demodulator means a sequence of successive groups of impulse response values of a transmission channel from said transmitter to said antenna, and maximum response detector means coupled to said impulse response detector means for detecting one of the groups having a maximum power and classifying the impulse response values of the detected group as equalizable delay components and classifying remaining impulse response values as unequalizable delay components;

a plurality of power ratio detector means respectively connected to said plurality of maximum response detector means for deriving a power ratio of said equalizable delay components to said unequalizable delay components; and means for detecting a minimum value of the power ratios derived by said plurality of power ratio detector means.

2. A space diversity receiver as claimed in claim 1, wherein said burst signal contains a preamble of a predetermined bit pattern, and wherein said impulse response detector means comprises a correlator for detecting bit-by-bit correlation between said preamble and an intermediate portion of said preamble stored in memory to produce said sequence of response values respectively for different symbol delay times.

3. A space diversity receiver as claimed in claim 2, wherein said preamble comprises a header portion, said intermediate portion and a trailer portion, said intermediate portion including a first section identical to said trailer portion, a second section, and a third section identical to said header portion.

4. A space diversity receiver as claimed in claim 2, wherein said maximum response detector comprises:

means for squaring each of said impulse response values of each of said groups;

means for summing said squared response values of each of said groups to produce a plurality of summed response values;

means for detecting a maximum value of said plurality of summed response values; and means for selecting a group of said impulse response values from said sequence supplied from said impulse response detector means which corresponds to a group of said squared impulse response values from which said maximum value is derived and classifying said selected group as said equalizable delay components and classifying said impulse response values of said sequence other than said selected group as said unequalizable delay components.

5. A space diversity receiver as claimed in claim 1, further comprising:

an equalizer having first and second input terminals; and means for coupling the output of the demodulator means of one of the signal paths which is associated with said minimum value to the first input of said equalizer and coupling the equalizable delay components of the last-mentioned signal path to the second input of said equalizer.

6. A space diversity receiver as claimed in claim 5, wherein said equalizer is a maximum likelihood sequence estimator.

7. A space diversity receiver as claimed in claim 6, wherein said maximum likelihood sequence estimator comprises:

a matched filter to which said output of the demodulator means and said selected group of response values are applied;

means for deriving branch metric coefficients from said selected group of response values;

means for combining an output of said matched filter and said branch metric coefficients; and a Viterbi decoder coupled to said combining means.

* * * * *